(12) United States Patent
Renton

(10) Patent No.: US 7,104,371 B2
(45) Date of Patent: Sep. 12, 2006

(54) ENERGY ABSORBER

(75) Inventor: Julian Renton, Bradford on Avon (GB)

(73) Assignee: Keyguard Limited, (GB)

( * ) Notice: Subject to any disclaimer, the term of this patent is extended or adjusted under 35 U.S.C. 154(b) by 0 days.

(21) Appl. No.: 10/276,733

(22) PCT Filed: May 16, 2001

(86) PCT No.: PCT/GB01/02174

§ 371 (c)(1),
(2), (4) Date: Mar. 25, 2003

(87) PCT Pub. No.: WO01/87420

PCT Pub. Date: Nov. 21, 2001

(65) Prior Publication Data

US 2003/0151180 A1     Aug. 14, 2003

(30) Foreign Application Priority Data

May 18, 2000 (GB) ................................. 0012073.3
Nov. 13, 2000 (GB) ................................. 0027664.2

(51) Int. Cl.
*F16F 7/12* (2006.01)
*E04G 3/28* (2006.01)

(52) U.S. Cl. ........................... 188/371; 182/36; 182/45

(58) Field of Classification Search ............. 182/36 X, 182/45 X, 36, 45; 188/371, 373, 374, 381, 188/65.1–65.5; 267/69–74, 155, 156

See application file for complete search history.

(56) References Cited

U.S. PATENT DOCUMENTS

| | | | |
|---|---|---|---|
| 3,087,584 A | 4/1963 | Jackson et al. | |
| 3,561,690 A | 2/1971 | Muskat | |
| 3,743,267 A | 7/1973 | Guerster et al. | |
| 4,258,934 A | 3/1981 | Tsuge et al. | |
| 4,358,136 A | 11/1982 | Tsuge et al. | |
| 4,877,110 A | 10/1989 | Wolner | |
| 4,978,139 A * | 12/1990 | Andres et al. | ............ 280/805 |
| 5,131,470 A | 7/1992 | Miszewski et al. | |
| 5,332,071 A * | 7/1994 | Duncan | ............ 188/371 |
| 5,361,867 A | 11/1994 | Olson et al. | |
| 5,720,496 A | 2/1998 | Riefe et al. | |
| 5,771,993 A | 6/1998 | Anderson et al. | |
| 5,829,548 A | 11/1998 | Ostrobrod | |
| 6,918,464 B1 | 7/2005 | Renton | |

FOREIGN PATENT DOCUMENTS

EP     0 212 826     3/1987

(Continued)

*Primary Examiner*—Xuan Lan Nguyen
(74) *Attorney, Agent, or Firm*—Brooks Kushman P.C.

(57) ABSTRACT

An energy absorber comprises a helically coiled stores of at least partially yielding material that is drawn over a roller, or two rollers on perpendicular rotational axes, and securely fixed to a base that is attached to fragile structure such as a roof so that when an external force of sufficient size is applied to the roller or rollers through a connecting attachment eye the coil together with roller or rollers moves away from the attachment to the base whilst the coiled material is deployed over the roller or rollers. The absorber may be housed in a casing that is fixed to the base such that the strength of the fixing to the base is sufficient to withstand a pre-determined load after which the fixing fails and the housing moves with the coiled store providing protection for both the coiled store and fragile structure.

10 Claims, 10 Drawing Sheets

FOREIGN PATENT DOCUMENTS

| | | |
|---|---|---|
| EP | 0 252 031 A1 | 1/1988 |
| EP | 0 949 136 A1 | 10/1999 |
| GB | 964095 | 7/1964 |
| GB | 964096 | 7/1964 |
| GB | 998512 A | 7/1965 |
| GB | 1020556 | 2/1966 |
| GB | 1060974 | 3/1967 |
| GB | 1186332 | 4/1970 |
| GB | 1237224 | 6/1971 |
| GB | 1601809 | 11/1981 |
| GB | 2101705 | 1/1983 |
| GB | 2244305 | 11/1991 |
| GB | 2351789 A * | 1/2001 |
| WO | WO 95/29738 | 11/1995 |
| WO | WO 95/32759 | 12/1995 |
| WO | WO 97/37876 | 10/1997 |
| WO | WO 99/22817 | 5/1999 |

* cited by examiner

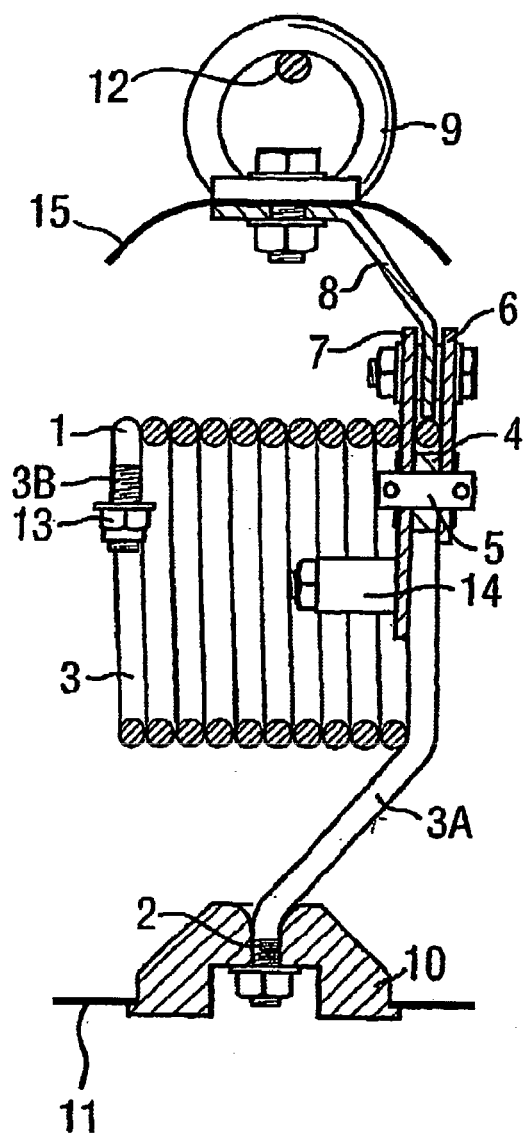
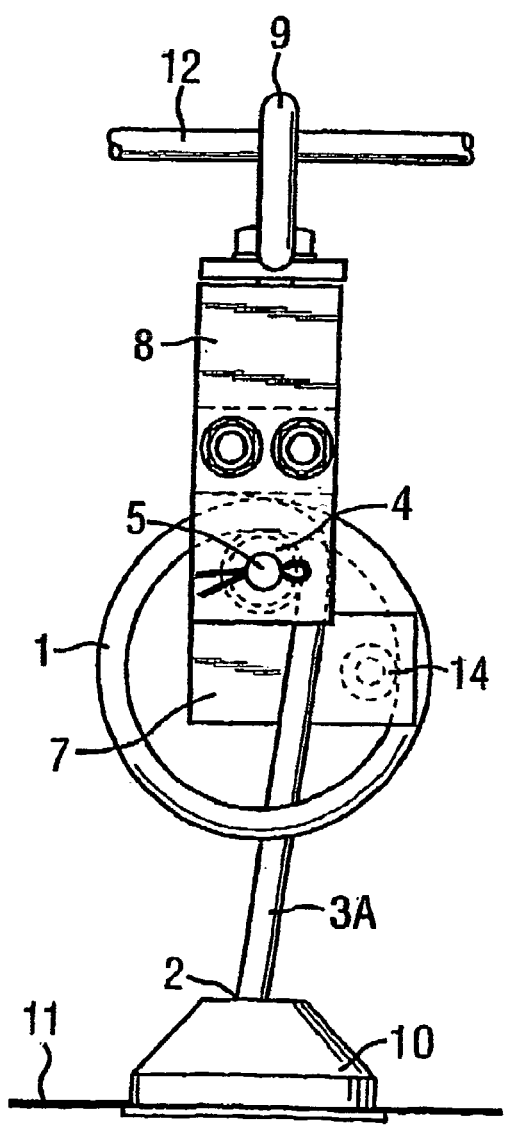
FIG. 1
FIG. 2

ENERGY ABSORBER

This invention relates to an energy absorber and in particular to an energy absorber intended for attachment to relatively fragile structures for use in applications such as height safety equipment.

BACKGROUND OF INVENTION

Height safety equipment is intended to prevent fall injuries to personnel working at height. A common arrangement for height safety equipment is for a safety rope or cable to be attached between end anchor points in an area to which access is required. Intermediate anchor points can then be added along the length of the cable to reduce fall distances before arrest and also to enable a change in direction along the length of a cable between end anchor points such that the cable can be routed around corners or some other direction. Personnel wear harnesses connected to travellers that are attached to and able to move freely along the safety ropes or cables. More sophisticated travellers are able to transverse intermediate anchor points without becoming detached from the cable.

The loads likely to be applied to anchor points depend on various factors. Probably the most significant of these is whether the height safety equipment is a restraint system intended simply to restrain personnel against the possibility of falling or whether the height safety equipment is a fall arrest system intended to arrest personnel safety immediately following a fall. Fall arrest systems allow personnel to access areas close to edges of building or tall structures whereas restraint systems limit movement of personnel to safe access areas where there is no possibility of a vertical fall. Therefore, maximum likely loading on anchor points in restraint systems is substantially less than that in fall arrest systems. This invention is intended for use in fall arrest systems although it could also be used in restraint systems.

One example of a commonly accessed fragile structure is roofs on relatively tall buildings. Fall arrest systems are installed to enable access to areas where falls are possible such as gutters and areas close to roof lights. Many such roofs exist on commercial buildings where the roof structure comprises pieces of relatively thin steel sheet formed with regular ridges that run typically from the apex of the roof along its pitch to the edge. Each piece is usually attached to adjacent pieces and all pieces are fixed to a system of lightweight formed steel beams that provide rigidity over the area of the roof and attach the roof to the surrounding ground bearing structure such as walls, pillars or external suspending structures. Whilst such roofs are intended to withstand the worst anticipated weather conditions they are not designed to cope with the relatively high localised loading that may be transmitted through fall arrest system anchor points.

The attachment of anchor point brackets to roofs by fall arrest system installers is most conveniently achieved by screwing the brackets directly to the roof sheets. This avoids the need to access the internal roof structure from outside the roof and also utilises the attachment techniques most commonly applied in the roof installation industry. Further, this allows the anchor point locations to be determined solely by the requirements of the fall arrest system because the anchor points can be located anywhere on the roof surface and are not limited to locations where they can be attached to the beams.

The structural strength of roofs formed of roof sheets is not very great. Therefore, where fall arrest system anchor points are attached to the roof sheets directly rather than to the support structure, it is important that the loading applied to the roof structure is limited.

Further, whilst screws used in roofing tend to provide good grip in shear, they pull out relatively easily in tension largely as a result of tearing in the thin steel roof sheet. Therefore, it is important where fall arrest system anchor points are attached to a roof, particularly with screws, that loading on the anchor point attachment to a roof is limited and primarily applies shear forces to attachment screws irrespective of fall conditions such as fall distances and number of personnel falling.

In order to arrest personnel safety following a fall, a fall arrest system needs to absorb all fall energy safely and without subjecting personnel to arresting loads greater than maximum safe values, which are specified by industry and international regulations. Also, most international regulations require that any load on any part of the system following the most demanding fall conditions for which a system is designed should never be greater than 50% of the load at which such a part fails. This safety factor is also applied to anchor point attachments and their supporting structures such as a wall or roof.

Cable such as steel wire commonly used in cable based fall arrest systems has very little elastic stretch and therefore absorbs little fall energy in the event of arresting a fall unless end anchor point loading is able to be relatively high. Personnel wear energy absorbing lanyards to limit arresting loads on personnel and these will assist to some extent in absorbing fall energy, although the deployment force of the lanyard absorbers is relatively low and also the deployment extent has the effect of adding to the fall distance and therefore the fall energy. However, anchor point loading on relatively fragile structures needs to be limited to a maximum of 50% of the strength capability of the structure itself. End anchor point loading in the event of fall energy absorption by elastic stretch alone would easily exceed 50% of the capability to failure to anchor point attachments to many roofs. Anchor point loading at a change in direction of the cable becomes significantly greater even than end anchor point loading. For example, an anchor supporting a ninety degree change in the direction of the cable would need to support a load increased by a factor to the square root of two.

A further condition that would cause high loading at an anchor point is where a multiple personnel fall occurs close to or on an intermediate anchor point. Initially, the multiple fall energy would need to be absorbed largely by reluctant extension at the anchor point itself to avoid high anchor loading. This depends on the degree of reluctance and extension. If the extension is low then loading at the anchor will be correspondingly high.

One problem encountered with energy absorbers, particularly for those used in fall arrest systems, is that the position at which a fall will occur relative to anchor point brackets cannot be predicted so that energy absorbers must be able to operate effectively for a fall arrest load being applied from a range of directions. Further, in order to allow economies of scale to be achieved by the use of common components throughout fall arrest systems and to avoid the possibility that a fall arrest system could be rendered ineffective by mounting an anchor bracket in the wrong orientation it is desirable to provide an energy absorber able to operate over a wide range of directions of applied load.

Accordingly, a first object of the invention is to provide an energy absorber capable of limiting loading to a known and safe value at its attachment to a structure irrespective of the direction of the loading.

A further object of the invention is to provide an energy absorber able to absorb a maximum or optimum amount of energy for a given extension and loading limit.

BRIEF SUMMARY OF THE INVENTION

In a first aspect, this invention provides an energy absorber comprising means for attaching the energy absorber to a supporting structure, means for attaching the energy absorber to a load element and orienting means responsive to a first predetermined tensile load applied to the means for attaching to a load element to change the orientation of the energy absorber towards the direction of an applied load, and further comprising a store of plastically deformable material and deployment means responsive to a second predetermined tensile load greater than the first effective to deploy said plastically deformable material in a controlled manner whereby said material is permanently plastically deformed during said deployment, thereby absorbing energy.

In a second aspect, this invention provides an energy absorber comprising means for attaching the energy absorber to a supporting structure, means for securing the energy absorber to a load element, a substantially cylindrical casing, and a store of plastically deformable material and deployment means contained within the casing, the plastically deformable material and deployment means being responsive to a second predetermined tensile load to deploy said plastically deformable material in a controlled manner whereby said material is permanently plastically deformed during said deployment, thereby absorbing energy, and further comprising orientation means including said casing responsive to a first predetermined tensile load lower than the second to change the orientation of the energy absorber by rotation about a lower rim of the casing towards the direction of an applied load.

Energy absorbers according to the invention are able to absorb applied load energy from a very wide range of directions and is able to absorb an optimum amount of energy for a given allowed extension and maximum loading applied to a supporting structure.

Where the energy absorber is incorporated into an anchor point for a fall arrest system the anchor point is able to be used as an end anchor, corner anchor or intermediate anchor. Further, given the maximum anchor point load limitation, use of the energy absorber according to the invention enables an optimum or near optimum fall energy performance in terms of intermediate anchor spacing, fall distance and number of personnel in a multiple fall situation.

This is achieved primarily by providing sufficient constant or near constant force energy absorption at each anchor point so that anchor point loading is limited to the designed constant deployment force irrespective of system fall conditions. Furthermore, the absorber in each anchor point is capable of deploying in any direction substantially in the plane of the surface to which it is attached in order to provide for the multi-directional possibilities required in the various anchor point applications such as end anchor, intermediate anchor and change of cable direction anchor. This invention also includes the constant force absorber incorporated into a bracket for fixing to a fragile structure.

BRIEF SUMMARY OF THE DRAWINGS

The invention will now be described by way of example only with reference to the accompanying diagrammatic figures, in which:

FIG. 1 shows a partially cut away view of an energy absorber according to a first embodiment of the invention;

FIG. 2 shows an elevational partially cut away view from a direction perpendicular to FIG. 1;

Referring to FIGS. 1 to 5, a first embodiment of the invention is shown.

DETAILED DESCRIPTION OF THE PREFERRED EMBODIMENTS OF THE INVENTION

Figure 3:
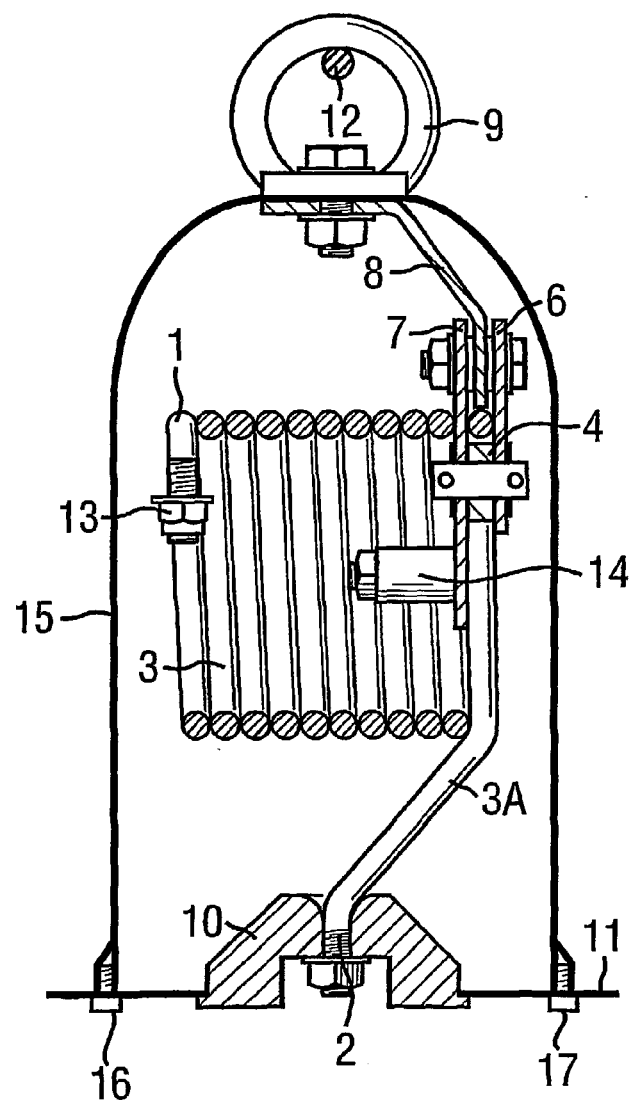
FIG. 3 shows a further sectional view of the energy absorber of FIG. 1 with an external casing in place.

In the energy absorber of the first embodiment coiled store 1 is a helically wound coil store of at least partially yielding material 3 such as stainless steel rod, one end of which is passed around roller 4 and rigidly fixed to raised feature 10 on base plate 11. Base plate 11 is rigidly attached to a suitable location on a high building or structure as part of a fall arrest or some other system requiring energy absorption. The base plate 11 may be directly attached or may be attached through a suitable bracket or other element.

Roller 4 is free to rotate about pin 5 with the axis of rotation being parallel to the axis of the helical coil. Pin 5 is attached to a deployment structure comprising connected plates 6, 7 and 8 and also load pulling eye 9. The plates 6 and 7 are parallel and spaced apart on either side of the roller 4 to hold the roller 4 between them and define a channel through which the material 3 from the coiled store passes. The pin 5 is attached to the plates 6 and 7. The plate 8 links the plates 6 and 7 to the load pulling eye 9. Fall arrest system cable 12 passes through the load pulling eye 9. A guide 14 is rigidly attached to plate 7 and projects into the inside of the helical coil.

When an increasing load is applied to eye 9 in any direction above base plate 11, plate 8 tends to straighten together with the part 3*a* of helical coil material 3 between roller 4 and raised feature 10 until the load is sufficient to begin pulling and yielding coiled material 3 over roller 4. The guide 14 projects from the plate 7 into the interior of the coiled store 1. Guide 14 is formed by a roller and is in contact with the inner surface of the coil on the opposite side of the roller 4 to the entry direction of the coil material 3 when pulling of the coil material 3 over the roller 4 occurs. Guide 14 counteracts the tendency for the axis of the helical store to move relative to the axis of roller 4 and therefore ensures a constant degree of yielding of material 1.

Typically, for use in a fall arrest system the load required to begin yielding and deployment of the material 3 is about 10 kN. This provides the desired safety margin for a typical roof able to support a maximum load of about 20 kN.

The yielding of the coiled material 3 as it passed over roller 4 is arranged to be plastic deformation, allowing the yielding coiled material to absorb large amounts of energy as it deploys from the helical store 1.

Guide 14 is shown as operating within the helical coil in order to achieve a compact absorber but a guide could alternatively be located outside the coil.

In practice, the force required to be applied at eye 9 to initiate and continue yielding of material 3 in this manner has been found to remain substantially constant as the absorber deploys. On deployment, the helically wound coil 1 moves with roller 4 and the other parts of the deployment structure away from base 11 as the coiled material 1 unwinds around roller 4.

FIG. 3 shows the absorber housed in a casing 15 which is attached to the base 11 by fastenings 16 and 17. Note that the casing 15 is not shown or is shown only in part in FIGS. 1 and 2. In cable based fall arrest systems on structures such as roofs, the cable needs to be spaced well clear of the roof to avoid such things as sagging cables and fall arrest system travellers and shackles from damaging the roof surface. Casing 15 assists in supporting the absorber to provide the necessary spacing and protects the absorber components from the weather and other environmental effects. However, a problem with this spacing requirement is that when load is applied at eye 9 in a direction substantially parallel to the plane of a roof, the torque applied on the roof and fixings between the energy absorber and the roof due to the couple generated by the separation between eye 9 and the roof can become too high, tending to twist roof sheeting and to apply an undesirable pull out load on screws fixing the absorber to the roof. In order to overcome this problem the absorber is able to rotate about the raised feature 10 by bending of the section 3a of material 3 until the absorber is in line with the direction of the force applied to the eye 9. The couple acting on the roof and fixings is then reduced to the couple generated by the much smaller distance between the roof and the top of the raised feature 10, greatly reducing the torque applied on the roof and fixings. This makes the pull out force applied to any screws relatively small, most of the load acting as a shear force.

Figure 4:
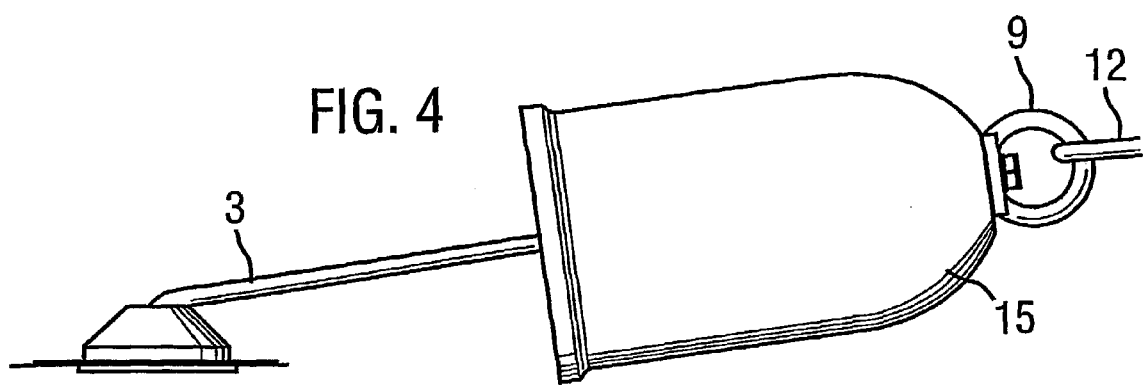
FIG. 4 shows the energy absorber of FIG. 1 in operation.

In order to prevent bending of the material 3 under low loads the casing 15 supports the absorber, holding the eye 9 in a fixed position relative to the base 11. The casing 15 is designed to resist becoming detached from base 11 until the load on eye 9 has reached a pre-determined size. At this point the fastenings 16 and 17 fail and allow casing 15 to part from base 11. This predetermined detachment load is designed to be sufficiently low to avoid significantly damaging the roof and is lower than the load required to deploy the material 3 from helical store 1 over the roller 4. Further increases of load on eye 9 may then reach a size where the absorber begins to deploy such that casing 15 follows the movement of helical store 1 and eye 9 away from the base 11 on deployment, as shown in FIG. 4. Factors determining the choice of this pre-determined load at which casing 15 parts from base 11 are partly to do with avoiding accidental damage to the absorber and bracket by personnel, particularly because personnel may use the absorber and bracket as a convenient purchase point for maintaining their balance or arresting a slip (as opposed to a fall). However, there is also the important consideration of withstanding the pre-tensioning of cable 12 suspended between absorbers and the possibility of personnel applying accidental loading on the cable leading to the possibility of absorbers and brackets leaning prematurely.

Essentially the predetermined parting load should be high enough that parting will only occur in a fall arrest situation and low enough not to cause damage to the roof or fixings. A parting load of about 2500 N(2.5 kN), that is, approximately one quarter of the deployment load, has been found to be effective in practice.

A further factor to be considered in deciding the spacing of eye 9 above a fragile structure such as a roof is that upon detachment of casing 15 from base 11 the rotational movement of eye 9 about the anchor 2 provided by the fixing of the end of material 3 to base 11 translates into a corresponding increase in the extent to which a person falls vertically in the event of an arrested fall. This extent needs to be minimised to reduce the total fall arrest energy which must be absorbed and also the distance fallen before a fall is arrested, particularly where the distance between the edge of a roof or fragile structure and the ground is relatively small. Therefore, it is desirable to arrange the position of anchor 2 and raised feature 10 above the roof or fragile structure at a distance where the resulting torque on the roof or fragile structure is sufficiently low to avoid damage and indeed sufficiently low to avoid failure of the roof or fragile structure when twice the load on eye 9 that initiates yielding and movement of material 3 is applied to the roof or fragile structure. This problem is addressed by locating anchor point 2 above the roof or fragile structure so that the resulting torque on the roof or fragile structure is close to the strength limitations of the roof or fragile structure to avoid giving away excessive effective fall arrest line extension without significant resistance and therefore without energy absorption.

Further, casing 15 provides a protective shell between the absorber and roof during absorber deployment because the absorber parts are contained within the casing 15 as shown in FIG. 4. Whilst this is important to avoid or minimise damage to roofing, it also reduces the possibility of the absorber on deployment becoming caught on awkward surfaces in the path of deployment.

Thus, when a fall arrest event occurs the operation of the energy absorber is as follows. The energy absorber remains in place without moving until the loading applied to the eye 9 through the cable 12 reaches the detachment load. The fastenings 16 and 17 then fail, releasing the casing 15 from the base 11. This separation allows the absorber to rotate about the anchor point 2 where the material 3 is attached to the raised feature 10 on base plate 11 so that the absorber is oriented in the same direction as the pulling force applied to the eye 9 by the cable 12.

This rotation of the absorber is allowed for by deformation of the material 3 in the region 3a between the roller 4 and the raised feature 10, which allows the distance of the eye 9 from the raised feature 10 to increase slightly.

During a fall arrest event the load applied to the eye 9 through the cable 12 will then increase beyond the deployment load required to plastically deform the coiled material 3 out of the coil 1 and over the roller 4. Under this load the eye 9 and attached parts of the energy absorber making up the deployment structure will move away from the raised section 10 in the direction of the load applied by the cable 12 as the material 3 is deployed out of the coil and around the roller 4.

The plastic deformation of the material 3 as it deploys out of the coil around the roller 4 absorbs energy, in the case of fall arrest the fall energy, and generates a substantially constant deployment force, which in a fall arrest system acts to slow and eventually stop the fall.

Eventually, all of the fall energy will be absorbed in plastically deforming the material 3, the fall arrest forces will drop too low to deploy the material 3 out of the coil 1 around the roller 4 and deployment of the material 3 will stop.

Usually the energy absorber will be designed so that all of the energy expected to be released in a fall arrest incident will be absorbed before all of the material 3 in the coil 1 is deployed. However, it is possible that unforseen circumstances may cause the fall arrest energy to be greater than expected so that all of the material 3 in the helical coil 1 will be deployed.

Figure 5:
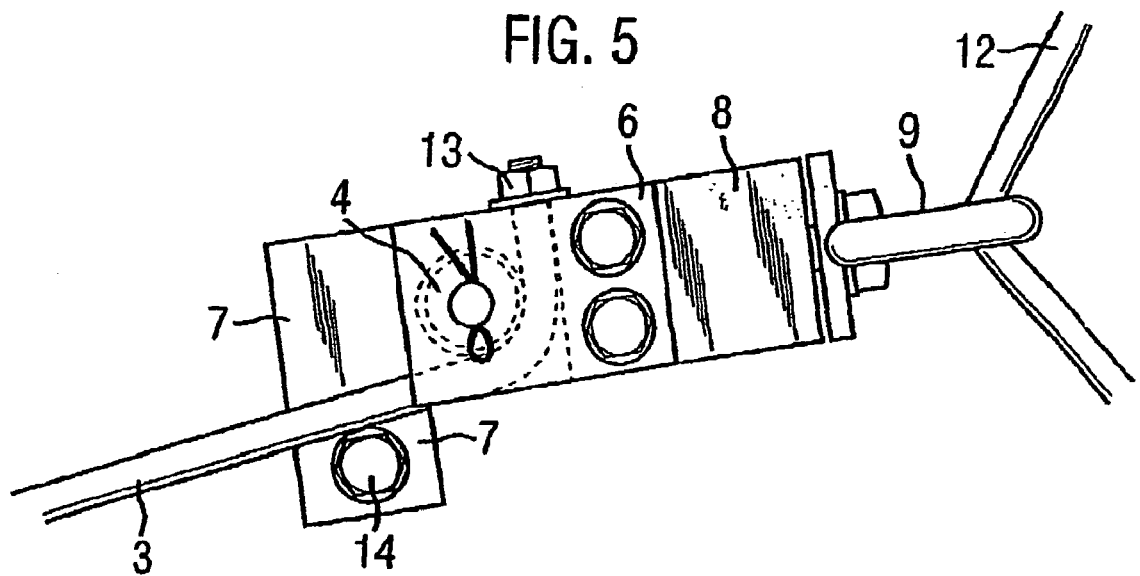
FIG. 5 shows a detail of an end stop arrangement of the energy absorber of FIG. 1.

FIG. 5 shows the operation of an end stop in the event that the absorber's helical store becomes fully deployed. This end stop is important in height safety equipment in order to comply with industry and international standards. Most such standards require that after complete deployment of an energy absorber the absorber should withstand at least twice its working deployment load without failing. Failure in this context refers to any failure of connecting components between eye 9 and the roof or other fragile structure to which base 11 is attached. If a sustained load greater than the deployment force is applied after a fall has been arrested, the material 3 will deploy until all of the material 3 has been deployed. Accordingly an end stop is required to prevent separation of the eye 9 from the base 11.

In the arrangement shown, an end stop 13 is provided by nut 13 located on a threaded end part 3b of the material 3. The nut 13 is larger than the clearances between the plates 6 and 7 and between an edge of plate 8 and the roller 4. Accordingly, when the end of the material 3 is reached during deployment the nut 13 is unable to pass between the plates 6 and 7 and so does not reach the roller 4. However, for safety it is preferred that the nut 13 is also unable to pass between the plate 8 and roller 4 to provide a secondary back up end stop. As can be seen from FIG. 5 the nut 13 is arrested by contact with plates 6 and 7 while the material 3 is in contact with the roller 4.

In this end stop arrangement the material 3 passes around the roller 4 beyond the point at which the end stop 13 is stopped by the plates 6 and 7. As a result, although the absorber as a whole must be able to support double the deployment load, the corresponding load which the end stop 13 is required to resist is lower than this. This is because some of the load supported by the absorber is supported by the "capstan effect" of the material 3 passing around the roller 4 and so is not applied to the end stop 13.

Alternatively, end stop 13 can be any structure presenting an enlarged cross section of material 3 such that the enlarged part is held by a restriction provided between plates 6, 7 and 8, or some other restriction means.

Figure 6:
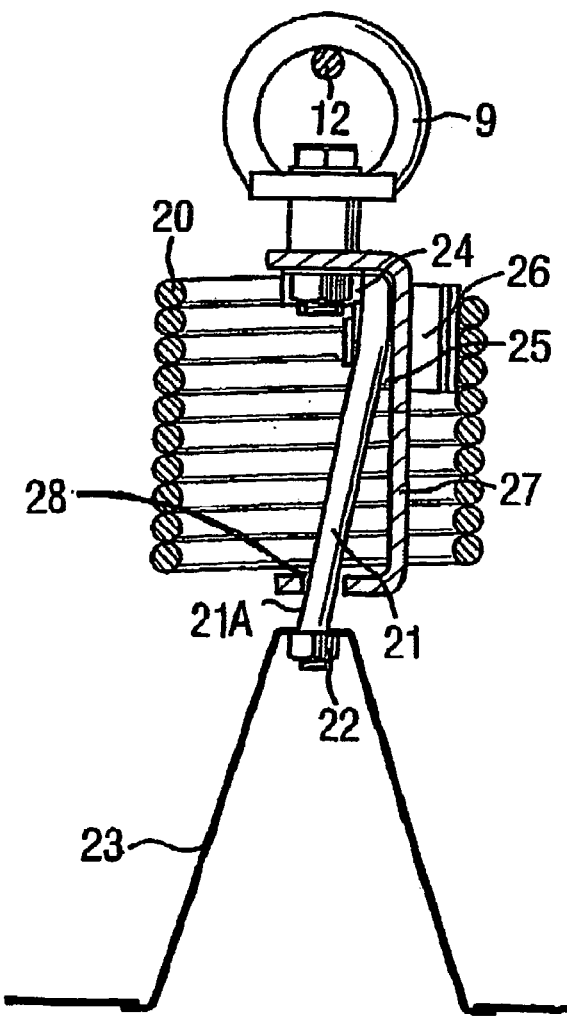
FIG. 6 shows a partially cut away elevational view of an energy absorber according to a second embodiment of the invention.
Figure 7:
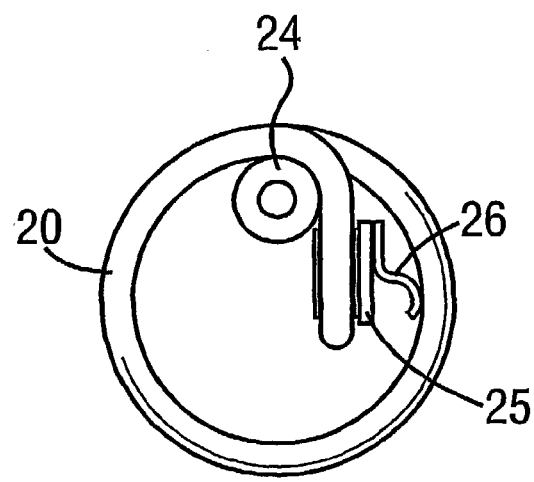
FIG. 7 shows a partially cut away top view of the energy absorber of FIG. 6.

FIGS. 6 and 7 show a second embodiment of the invention wherein a helical coil store 20 of partially yielding material 21 has a coil axis that is substantially parallel to the direction of pull on eye 9. This provides a compact arrangement that can fit easily within a neat cylindrical post with a smaller outside diameter than casing 15 shown in FIG. 3. End 21a of the partially yielding material 21 is passed around rollers 24 and 25. The rollers 24 and 25 are both mounted for rotation on a deployment structure 27 for rotation about mutually perpendicular axes. The rotational axis of roller 24 is substantially parallel to the wound axis of helical store 20 and perpendicular to the rotational axis of roller 25 such than end 21a of the partially yielding material passes within and through the helical store coils and through a guide hole 28 shown as part of a structure 27 and is then fixed securely to base 23 at fixing location 22. Guide hole 28 is intended to constrain the yielding material to assist its alignment with respect to roller 24. The pulling eye 9 is also fixed to the deployment structure 27. Fall arresting cable 12 typically passes through eye 9 as before.

When an increasing load is applied to eye 9 in any direction, typically in a fall arrest system the applied load will be parallel to or above the plane of base 23, the absorber will tend to lean in the direction of the applied load to eye 9, such leaning being determined between eye 9 and the attachment at anchor 22 of the end of the partially yielding material to base 23. Continued increasing of the applied load to eye 9 will result eventually in material 21 being pulled around rollers 24 and 25 thereby undergoing plastic deformation due to yielding. Guide 26 is an abutment being either part of or fixed to structure 27 that counteracts the tendency for helical store 21 to become misaligned with respect to roller axes 24 and 25 as material 21 yields around rollers 24 and 25. As yielding of material 21 is initiated and continues thereafter the applied pull load on eye 9 tends to remain constant because of the consistency and predictability of the plastic yielding process. Energy is therefore absorbed, the amount of which is the product of the load on eye 9 as material 21 is yielding and the length of material 21 that passes around rollers 24 and 25, allowing eye 9 to move with respect to base 23.

The embodiment shown in FIGS. 6 and 7 can also be combined with a casing 15 as shown in the embodiment in FIGS. 3 and 4 in order to control the applied load required to begin rotation or leaning of the absorber in the direction of the applied load and to provide environmental protection. Also, the need for a secure end stop after complete deployment of the coiled energy store as shown in FIG. 5 applies to the embodiment shown in FIGS. 6 and 7 and the end stop could be similar to that shown in FIG. 5 in that there would be an enlargement on the end of the material 21 that would be unable to pass through a restriction formed in structure 27 or some combination of either or both roller 24 and 25 or such combination and structure 27.

Figure 8A:
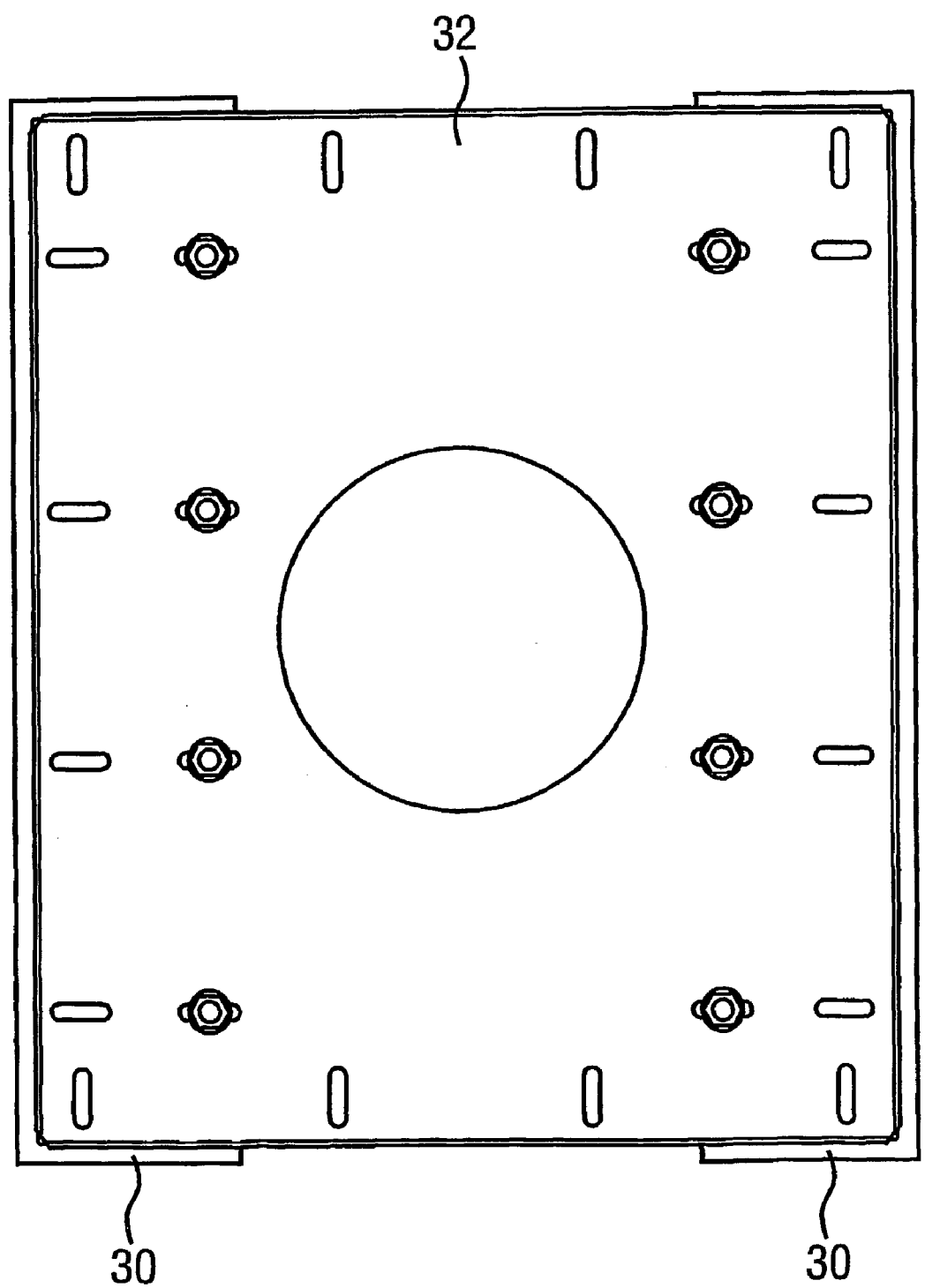
FIG. 8*a* shows a top view of a bracket arrangement suitable for use with energy absorbers.
Figure 8B:
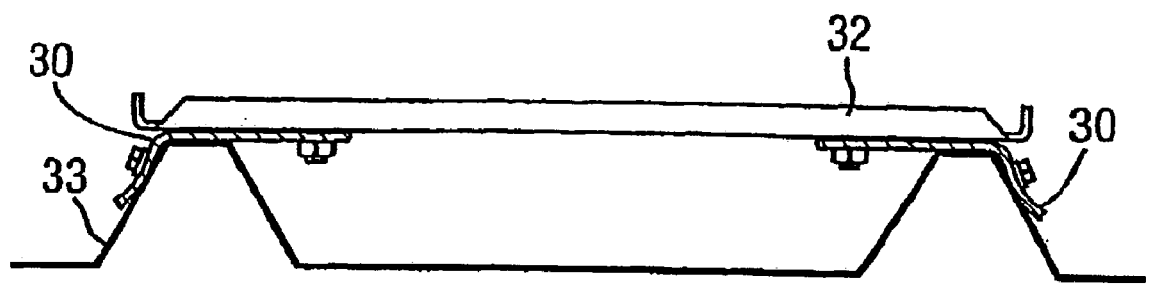
FIG. 8*b* shows an end view of the bracket of FIG. 8*a*.
Figure 8C:
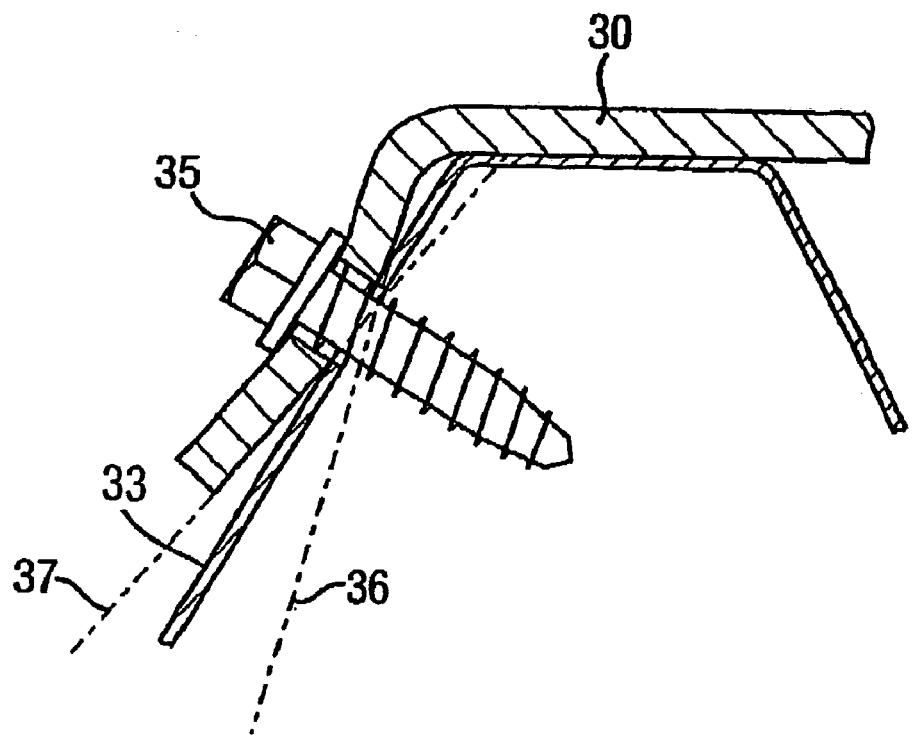
FIG. 8*c* shows a detail of the bracket of FIG. 8*a*.

FIGS. 8a, 8b and 8c show a bracket arrangement for fixing to different roof profiles. Whilst use of this bracket is not required to use the absorber and casing it is nevertheless useful in many applications requiring the absorber. Roof profiles vary considerably although nearly all profiles tend to feature longitudinal spaced apart and parallel ribs in roofing sheets, which typically run between the ridge and the edge of the roof. Roof sheeting is usually made of thin steel sheet sometimes reinforced for rigidity with material such as rigid expanded foam. The simplest way for fixing a base such as base 11 in FIGS. 1 to 4 to roof sheeting is by means of screws directly through the roof sheeting itself. However, it has been found that the mechanical strength of such screw fixing to roof sheeting is only relatively high when the resultant loading on the screws is substantially acting in shear on the screws. Resultant loading acting in tension on the screws tends to cause the screws to break through the thin roof sheet material relatively easily. Therefore, it is desirable to ensure as far as possible that the resultant loading acts in shear on screw fixings.

Roof profile 33 is typical in principle for common roof sheeting having ridges regularly spaced. In order to provide screw fixings 35 where the resultant loading is largely acting in shear on screw fixings 35, bracket 30 enables the screw fixings 35 to be fastened into the sloping faces of the ridges. A problem with this is that the angle of slope of the ridge sloping faces varies widely across different proprietary models of roof sheeting. To overcome this problem, fixing bracket 30 has a concave form as shown in FIG. 8c allowing fixture to slope angles varying from that shown as 36 and 37.

FIGS. 8a and 8b show a base 32 to which an energy absorber could be fixed. This base has a series of slotted positions that can be aligned in different arrangements with corresponding holes in fixing bracket 30 such that the fixing of base 32 to fixing bracket 30 can accommodate the most common different roof types. The main differences in such roof types are usually the spacing apart of the ridges, the width of each ridge and the angle of slope of each ridge. Therefore by providing the possibility of rotating base 32 by 90 degrees to provide two spacing variations together a variety of slotted holes base 32 can be fixed to bracket 30 to accommodate most common roof section designs.

The base 32 should be rigid enough to support the load at which the casing 15 separates without buckling. This is because if the base 32 buckles before separation occurs, the buckling base plate 32 will apply very high inward loads to the securing screws and brackets due to leverage.

Figure 9:
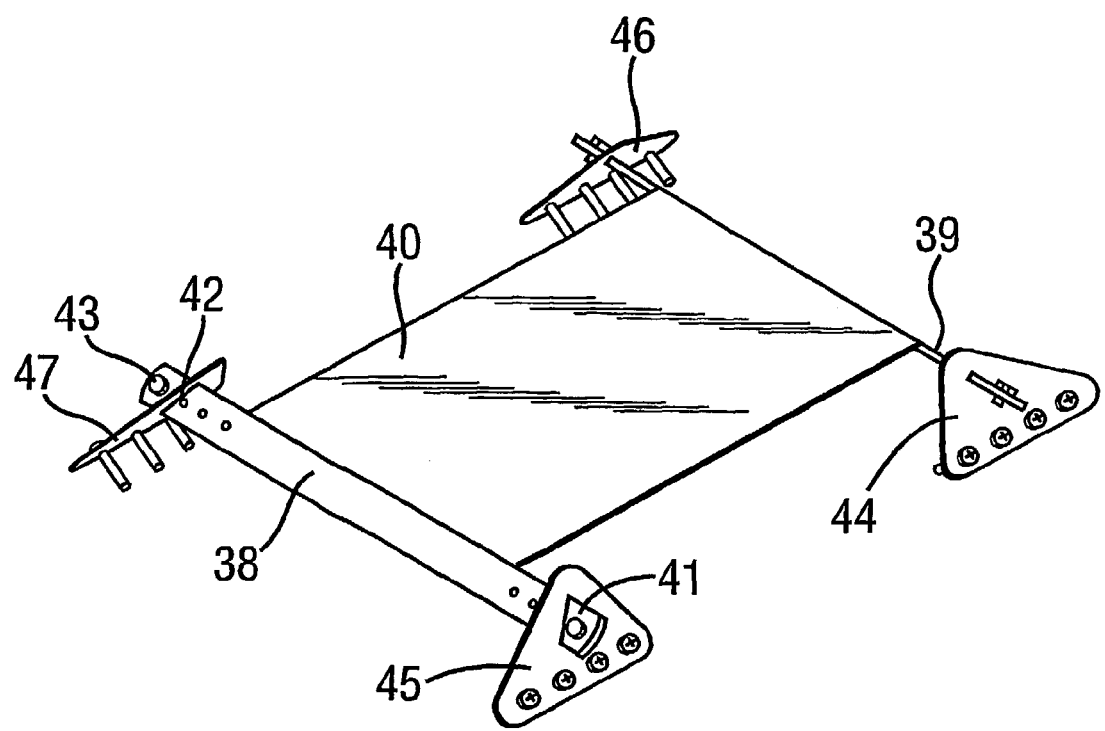
FIG. 9 shows an alternative bracket arrangement suitable for use with energy absorbers.

FIG. 9 shows a further method for attaching a base to a roof and is particularly suited to resisting loads applied from a position significantly above the surface of base 40 that result in torque loads on the base. Fixing brackets 44, 45, 46 and 47 are similar components each fixed to slopes on roof sheeting ridges. Each fixing bracket has a shaped typically straight side hole through which the ends 41 of cross bars 38 and 39 can pass but with sufficient clearance to enable some rotational adjustment of fixing brackets 44, 45, 46 and 47 to accommodate different roof sheet ridge slope angles. Cross bars 38 and 39 are part of or attached to base 40 and protrude beyond the edges of the rectangular perimeter surface of base 40 to provide adjustment for accommodating roof sheet ridges that are positioned apart at different spacings. Fixing brackets 44, 45, 46 and 47 can then be screw fixed to the slope surfaces of roof sheet ridges. End stops 43 can be inserted through holes 42 located at either end of cross bars 38 and 39 to limit lateral movement of base 40 in the event of lateral loading.

When a load is applied at position significantly above the surface of base 40, the resulting loading on cross bars 38 and 39 and the four fixing brackets is such that loading on the fixing screws in largely in shear. Also, because the load acting between the fixing brackets and cross bars is largely normal to the interconnecting surfaces and therefore results in relatively high friction between the cross bars and fixing brackets. This helps to limit sliding movement between the cross bars and fixings brackets. This friction effect can be increased by arranging one or more of the interconnecting surfaces to be toothed or to be sharp edged.

Fixing brackets 44 and 45 could be joined together to become one component. This component could also be used to provide the function of fixing brackets 46 and 47.

A third embodiment of the invention is shown in FIGS. 10 to 13. The energy absorber according to the third embodiment is arranged similarly to the absorber of the first embodiment with the coiled material axis perpendicular to the load direction.

Figure 10:
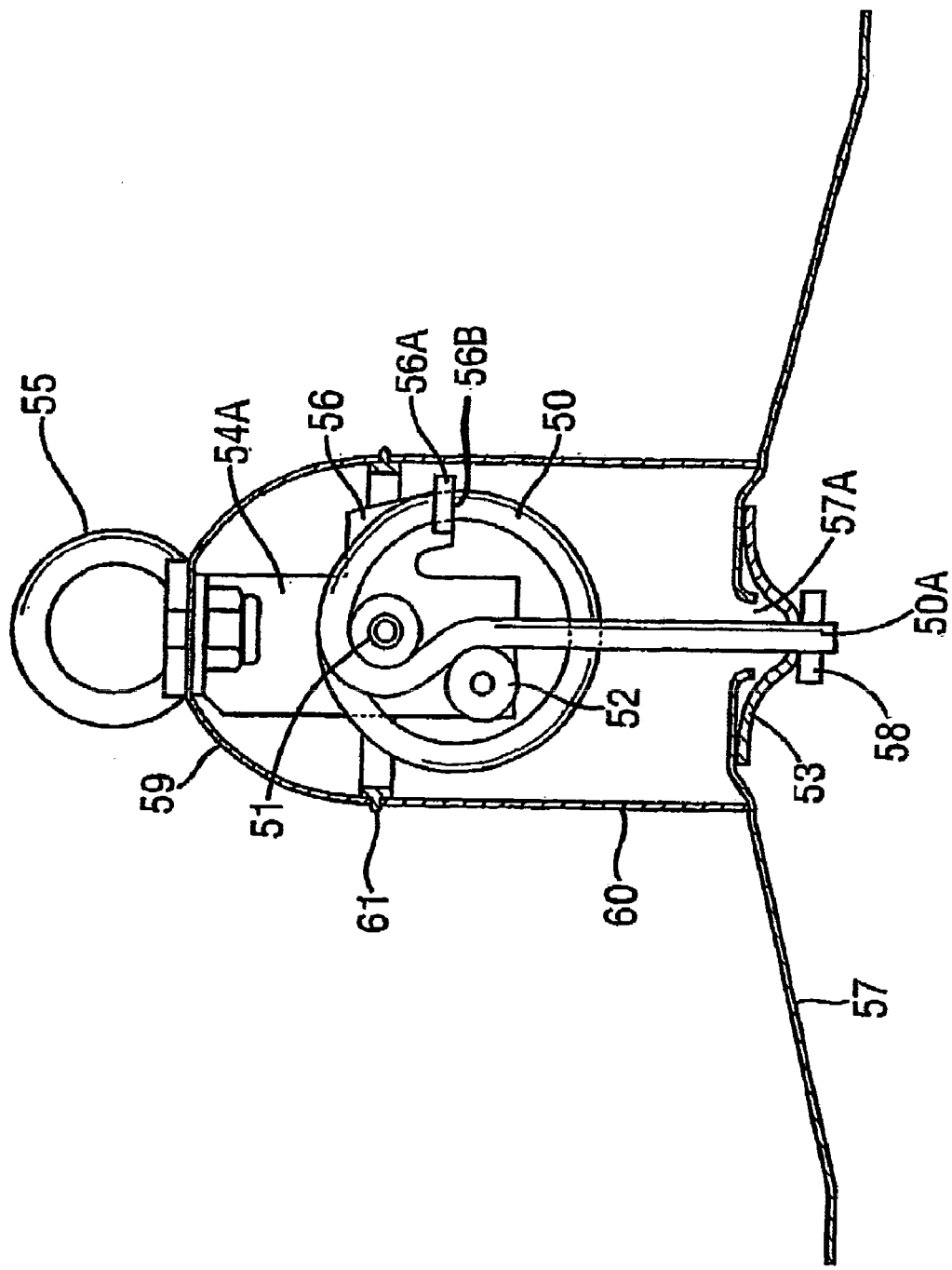
FIG. 10 shows a partially cut away side elevation view of an energy absorber according to a third embodiment of the invention.
Figure 11:
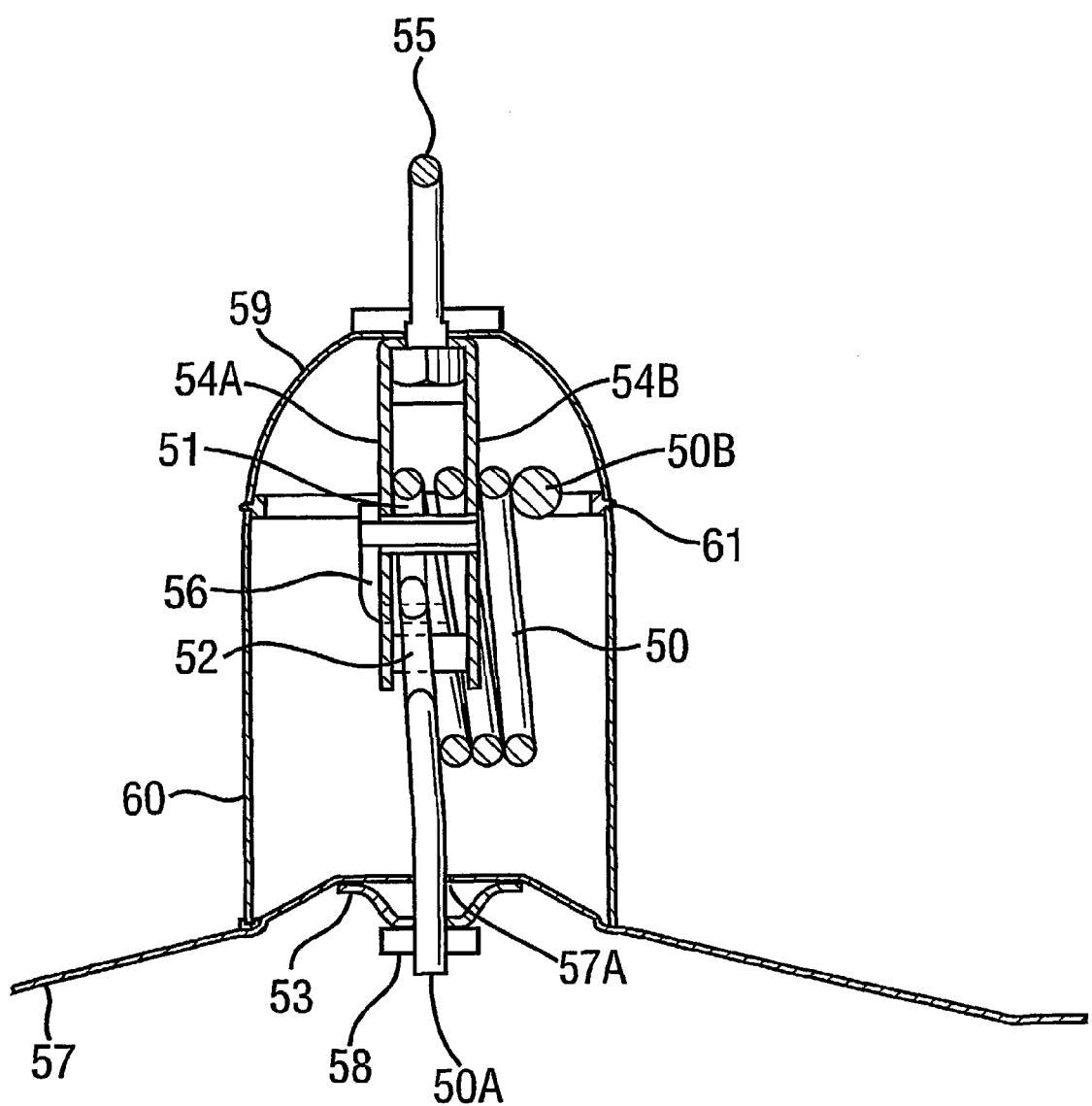
FIG. 11 shows a partially cut away side elevational view from a direction perpendicular to the view of FIG. 10.
Figure 12A:
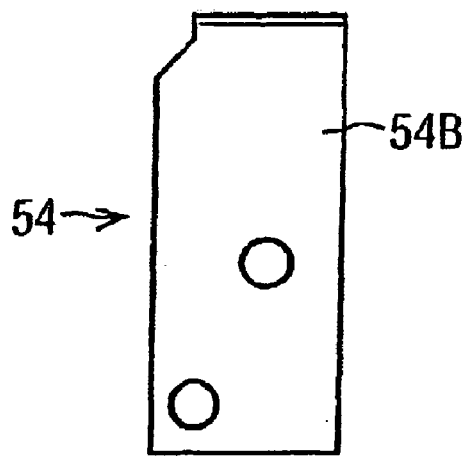
FIGS. 12*a* to 12*c* show views of a yoke used in the energy absorber of FIG. 10.
Figure 12B:
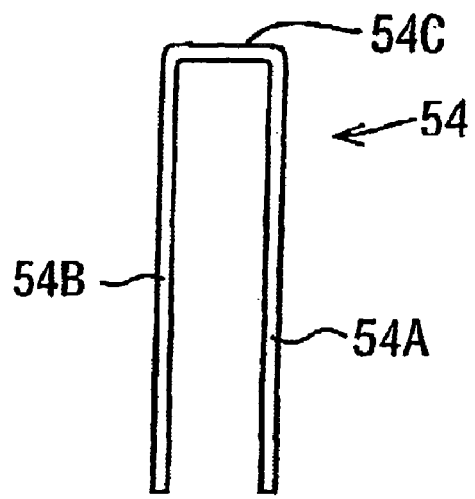
Figure 12C:
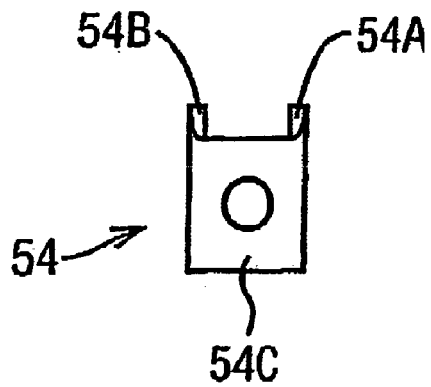
Figure 13:
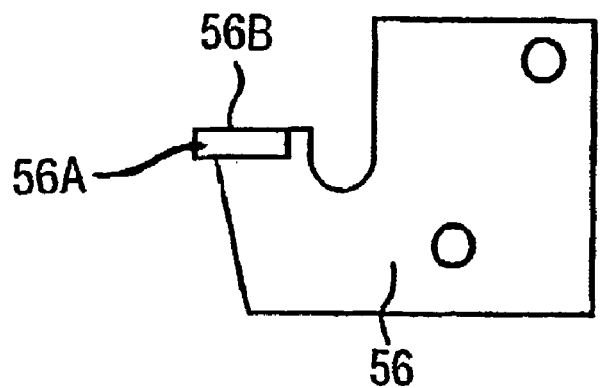
FIG. 13 shows a guide bracket used in energy absorber of FIG. 10.

As can be seen in FIGS. 10 and 11 the energy absorber of the third embodiment incorporates a helically wound coil store of a plastically deformable deployable material 50. One end 50a of the deployable material 50 passes around first and second rollers 51 and 52 and through a retainer element 53.

The rollers 51 and 52 are arranged for rotation around parallel axes about respective pins which are attached to a pair of spaced apart parallel plates 54a and 54b formed by the two side pieces of a substantially u-shaped yoke 54. The rollers 51 and 52 are located between the two side plates 54a and 54b of the yoke 54.

The two rollers 51 and 52 are located inside the profile of the coil, in order to provide a compact energy absorber.

A load pulling eye 55 is attached to an end piece 54c of the substantially u-shaped yoke 54 so that the pulling eye 55 is rigidly connected to the rollers 51 and 52.

A guide bracket 56 is attached to the first side plate 54a of the yoke 54. The guide bracket 56 has a projecting guide portion 56a extending substantially perpendicularly to the side plate 54a and having a hole 56b therethrough. The diameter of the hole 56b is sufficient to allow the yielding material 50 to pass through it and control the movement of the yielding material 50.

The yoke 54 together with eye 55, guide bracket 56 and rollers 51 and 52 form a deployment structure.

When a sufficient load is applied to the loading eye 55 the yielding material 50 will be deployed from the helical store by passing around the first roller 51. This bends the material so that it is plastically deformed in a first direction. The yielding material 50 then passes between the first and second rollers 51 and 52 before passing around the second roller 52 so that the material 50 is again plastically deformed but in the opposite direction. Before reaching the first roller 51 the material 50 passes through the hole 56b in the guide bracket 56 and this allows the guide bracket 56 to counter any tendency for the axis of the helical coil store to move relative to the roller 51 as the material 50 is deployed. The yoke 54 and guide bracket 56 are shown in more detail in FIGS. 12a to 12c and FIG. 13 respectively.

Typically, for use in a fall arrest system the load required to begin yielding and deployment of the material 50 is about 10 kN.

The energy absorber is retained on a base plate 57 by the end 50a of the deployable material 50 passing through a hole 57a in the centre of the base plate 57 and then through a retaining element 53. The end 50a of the deployable material 50 is screw threaded and a nut 58 is screwed onto the end 50a on the opposite side of the base plate 57 and retaining element 53 to the rest of the absorber to attach the deployable material 50 to the base plate 57.

Only a single nut 58 is shown, but further retaining elements, such as a locknut, could be added if desired.

Similarly to the first embodiment a casing is provided. In the third embodiment the casing is provided by a first substantially hemispherical cap portion 59 attached to the yoke 54 and pulling eye 55 and a substantially cylindrical body section 60 extending between the cap 59 and the base plate 57. A spacer ring 61 is held between the cap section 59 and the body section 60 of the casing. The body section 60 and retainer ring 61 are held in compression between the cap 59 and the base plate 57, the necessary compression forces being supplied by tightening the nut 58 on the deployable material 50 to pretension the energy absorber.

Typically, a pretension load of about 800N is applied.

As in the first embodiment, the casing supports the energy absorber against rotation until a predetermined, rotation, load is reached and protects the rest of the absorber from environmental effects.

A fall arrest system safety cable will normally pass through the load eye 55.

When a load is applied to the absorber through the load eye 55 in a fall arrest situation this load will generally be substantially parallel to the base plate 57. Where the absorber is mounted on a roof, the load will generally by substantially parallel to the roof surface to which the base plate 57 is attached.

In a fall arrest situation, when a fall arrest event occurs the energy absorber will initially support the applied load without movement until the applied load reaches a first, rotation, level. When the applied force reaches the rotation level the body portion 60 of the casing will rotate or pivot about its lower rim where it contacts the base plate 57, allowing the energy absorber to rotate about the lower rim of the body portion 60 until the energy absorber is arranged substantially parallel to the load applied to the load eye 55. Then, if the applied load increases to a higher second, deployment, level the deployable material 50 will begin deploying out of the helical store by moving around the rollers 51 and 52, allowing the deployment structure including the load eye 55 and other attached parts of the energy absorber to move away from the connection element 53.

Typically, for use in a fall arrest system, the load requested to begin rotation of the energy absorber is about 2.5 kN.

As the deployable material is deployed out of the helical coil around the rollers 51 and 52 the deployable material 50 is plastically deformed twice in opposite directions generating a substantially constant deployment force and absorbing the fall arrest energy.

The amount of energy absorbed by the deployment is the product of the deployment load which must be applied to the load eye 55 to cause deployment to occur and the length of the coiled material 50 which passes around the rollers 51 and 52, allowing the load eye 55 to move away from the attachment element 53.

Normally, the materials and dimensions selected for the absorber will be such that the amount of energy which will be absorbed by the energy absorber by the time the end of the deployed material 50 is reached is greater than the maximum expected fall energy in a fall arrest situation. However, it is prudent in case of unforeseen circumstances, as well as being a requirement in many countries under the relevant legislation as explained above, to provide an end stop to provide a hard stop to deployment of the deployable material 50 and movement of the load eye 55 when the end of the deployable material 50 is reached. Conveniently, this end stop can be provided by forming a portion SOB having an enlarged cross section at the end of the deployable material 50, the portion 50B having a cross section which is too large to pass through the hole 56b in the guide bracket 56.

The cylindrical body section 60 is preferably formed as a cylindrical steel cylinder which will not deform when the first predetermined rotation load is applied. As the body section 60 rotates or pivots about its lower rim, the distance between the retaining element 53 and the load eye 55 will increase. Accordingly, in order for this rotation to occur, some deployment of the deployable material 50 must occur. Further, bending and plastic deformation of the deployed material 50 occurs as the energy absorber rotates. Because the deployable material 50 deploys and bends, and so undergoes plastic deformation as the energy absorber rotates, the rotated or reoriented energy absorber will remain in line with the applied force after the force has been removed even if the applied force never reaches the second deployment level to begin deployment of the deployable material 50. As a result, the position of the energy absorber will provide a clear visual indication that an applied force at or above the first rotation level has been applied to the absorber so that the absorber can be replaced and the other parts of the fall arrest system serviced as necessary.

The deployment of the deployable material 50 during rotation of the energy absorber occurs at a lower applied load than the direct in-line deployment which occurs when the energy absorber is oriented with the applied load because of the leverage produced by the geometry of the energy absorber. The distance of the pulling eye 55 from the base of body section 60 is greater than the radius of the body section 60. Accordingly, movement of the pulling eye 55 through a set distance as it pivots about the lower rim of the body section 60 requires deployment of a length less than said set distance of the deployable material 50, so that the applied load required to deploy the material 50 is reduced. Or, to put it another way, the distance of the pulling eye 55 from the base of the body section 60 where the rim of the body section 60 contacts the base plate 57 is greater than the distance of the rollers 51 and 52 so that due to leverage the load applied to the material 50 to deploy it is greater than the actual load applied at the pulling eye 55.

The body section 60 of the casing could be formed of a frangible material and break up, or be formed of a plastically deformable material and plastically deform rather than be rigid and rotate about its lower rim when the applied force reaches the rotation level. Such arrangements would still be able to provide a clear visual indication of an applied force at or above the rotation level. However, the use of a rigid body section is preferred because this allows some energy to be absorbed by a reduced rate deployment of the deployable material 50 during rotation. As a result the length through which a falling user will fall unrestrained, and the total fall energy which must be absorbed, is reduced. As a result, the total distance fallen in a fall arrest situation is minimised.

When deployment of the deployable material 50 has occurred the resulting extension of the energy absorber and the projection of the deployed material will provide a clear visual indication that the energy absorber has been subject to a load above the second deployment level.

The end stop should be able to resist a load equal to at least double the deployment load being applied to the energy absorber.

It is preferred that the deployable material be a length of stainless steel rod having a circular cross section and in this case the end stop can be conveniently provided by an increased diameter end section 50B or by threading a nut having a larger diameter than the hole 56b onto the end of the deployable material 50 similarly to the end stop arrangement of the first embodiment, so that the end stop cannot pass through the hole 56b in the guide bracket 56.

Similarly to the first embodiment, because the deployable material 50 still passes around the rollers 51 and 52 when the end stop is engaged, the capstan effect of the rollers 51 and 52 and the deployable material 50 means that the load actually acting on the end stop is less than the load applied to the load eye 55.

Figure 14A:
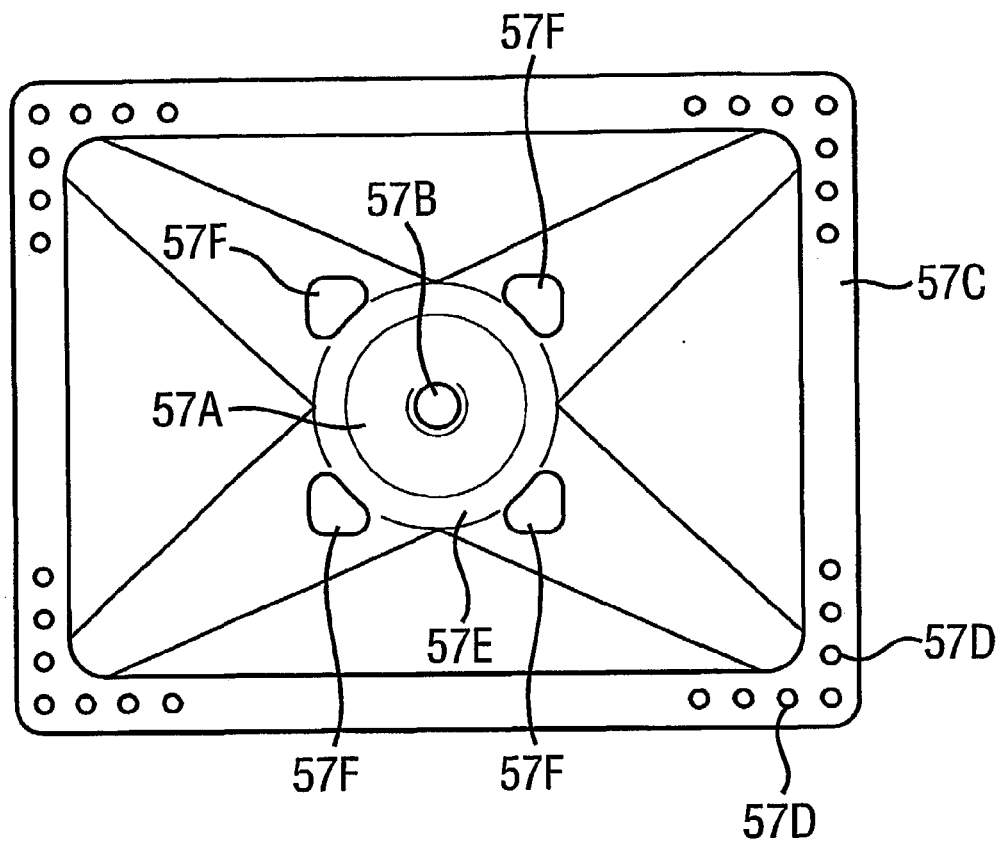
FIG. 14*a* shows a top view of a base plate suitable for use with the energy absorber of the third embodiment.
Figure 14B:
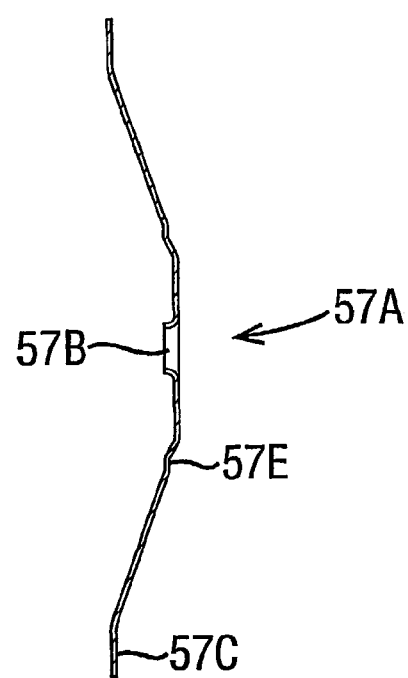
FIG. 14*b* shows a cross sectional view through the base plate of FIG. 14*a*.

The base plate 57 is shown in more detail in FIGS. 14a to 14c.

The base plate 57 is shaped as a substantially cone like shape made up of eight substantially flat faces arranged symmetrically.

The base plate 57 has a raised central portion 57a with a central hole 57b through which the deployable material 50 can pass to allow the energy absorber to be attached to the base plate 57. The base plate 57 has a flat outer rim 57*c* having a plurality of screw attachment holes 57*d* allowing it to be attached to a roof or other surface.

The central raised section 57*a* includes a circular ledge 57*e* on which the edge of the cylindrical portion 60 of the casing can rest.

Outside the circular ledge 57*e* four retaining elements 57*f* are arranged evenly spaced around the circumference of the ledge 57*e* and projecting a short distance above the surface of the ledge 57*e*. The retaining elements 57*f* prevent sideways movement of the cylindrical element 60 of the casing across the base plate 57. This ensures that the cylindrical section 60 does not move laterally as it rotates about its lower rim. If the cylindrical element 60 was able to slide laterally across the base plate 57, this could make the force level at which rotation would occur less predictable and stable.

The base plate 57 can be secured to standard roof sheeting such as that shown in FIG. 8*b* by placing the base plate 57 so that two of the opposed flat edges of the outer rim 57*c* of the base plate 57 lie along two parallel ribs of the roof sheet. The base plate 57 can then be fixed to the roof sheet by screwing through the appropriate ones of holes 57*d* through the roof sheeting along the top of the rib. The use of an oblong base plate 57 is preferred because this allows a single base plate 57 to be used on two different roof profiles having different ribs spacings with one dimension of the oblong base plate 57 matching each of the roof profiles. However, a square base plate could be used if preferred.

The faceted conical shape with a raised central section 57*a* of the base plate 57 provides greater resistance to deformation of the base plate 57 by fall arrest forces acting on the base plate 57 through the energy absorber. Further, the upward projection of the central section 57*c* of the base plate 57 provides sufficient clearance for the retaining element 53 and the end 50*a* of the deployed material 50 bearing the retaining element 58. However, in order to minimise the couple generated by forces applied through the energy absorber to the base plate 57, which couple will tend to apply an undesirable pull out force rather than a shear force to the screws used when the base plate 57 is attached to a roof, it will normally be desirable to keep the upwardly projecting height of the base plate 57 as low as possible.

The retaining element 53 distributes the forces acting through the deployable material 50 across a relatively large area of the base plate 57, reducing the possibility of local deformation or tearing of the base plate 57.

As explained regarding the base plate of FIGS. 8 and 9, deformation or buckling of the base plate 57 is undesirable, so the base plate should be rigid enough to prevent buckling.

The use of two rollers causing plastic deformation of the deployable material 50 in opposite directions increases the amount of energy which can be absorbed by the energy absorber for a length of deployable material having a particular cross section. This allows the energy absorber to be made more compact for a given energy absorbing requirement.

The use of a rod having a circular cross section as the deployable material is preferred because this ensures that the forces required to deploy the material and to rotate the energy absorber are substantially independent of the direction in which the load is applied to the eye 55.

Similarly to the casing 15 of the first embodiment the hemispherical cap 59 acts as a protective shell between the energy absorber and roof during absorber deployment, which avoids or minimises damage to the roofing and reduces the possibility of the absorber becoming coiled or fouled by awkward surfaces in the path of deployment.

The use of the spacer ring 61 is preferred, but is not essential.

The described embodiments relate to different designs of energy absorber. However, all of the energy absorbers of the described embodiments have the same fundamental operating principles so that features described with reference to one embodiment can generally be applied to the other embodiments. In particular, the energy absorber of the third embodiment could be attached to a support structure by the brackets described with reference to the first and second embodiments and vice versa.

It is desirable in fall arrest systems to be able to easily identify parts of the system which have been subject to heavy loads whether by a fall arrest event or otherwise so that parts can be checked and replaced as necessary. This is particularly important in systems using plastic deformation to absorb energy because the plastically deformed energy absorbing parts must be replaced after each usage. All of the embodiments of energy absorber according to the invention provide clear and distinctive visual evidence that they have been subjected to an excessive load by folding over when subject to the deformation load and then deploying the deployable material so that the deployment structure moves away from the base when subject to the deployment load.

As explained above, the described embodiments of energy absorber are able to operate reliably and to absorb a predetermined amount of energy at a predetermined deployment force a very wide range of applied force angles. When employed as energy absorbers in anchor points for a fall arrest system fall arrest loads are normally applied at an angle close to the roof plane but can potentially be in any direction in that plane. All of the embodiments described herein are able to operate in all directions in a plane over a wide range of angles above and below the plane.

The energy absorbers themselves are also able to operate at all angles above the base or roof plane. However, the brackets described for attaching the energy absorbers to support structures may not be effective at large angles above the base plane where the supporting structure is a fragile structure such as a roof because of the pull out loads applied to the attachment screws. Accordingly, if the energy absorbers are to be used in a fall arrest system attached to a fragile support structure which may be subject to loads at large angles above the base plane it may be necessary to use alternative attachment methods. However, such situations are very rare in fall arrest systems.

In the described embodiments the at least partially yielding material could have any cross section although stainless steel rod is preferred with the rod having a circular section to enable the absorber to be pulled readily in any direction typically parallel to or above base plate 11 or base 23. In practice it has been found that rod between 6 mm and 12 mm diameter is suitable. Whilst coiling of the helical energy store is shown as being coiled with a constant diameter, some embodiments may require the coil diameter to vary, particularly if the absorber had an irregular shaped outer casing instead of casing 11 as shown in FIGS. 3 and 4. However, use of a helical store with a constant diameter is preferred to ensure a near constant pull force on eye 9 during plastic yielding. This is because a small diameter coil is expected to provide greater resistance to plastic yielding around the rollers shown in the figures than if the coiled diameter was greater, and so produce a greater deployment force.

Ideally, the yielding process of the at least partially yielding material should be free from friction effects in order to achieve as near constant and predictable pull force on eye 9 throughout deployment. To assist with this, the at least partially yielding material and/or roller and/or axes of rotation of rollers may be coated in a low friction material such as molybdenum disulphide or plated in a coating such as silver or tin so that such surface coating becomes sacrificed on yielding of material and has the effect of reducing friction.

The described embodiments differ in their details but they are linked by common operating principles. Accordingly, it will be understood by the person skilled in the art that the technical features described with reference to one embodiment will normally be applicable to other embodiments.

Where the invention has been specifically described above with reference to these specific embodiments, it will be understood by the person skilled in the art that these are merely illustrative although variations are possible within the scope of the claims which follow.

What is claimed is:

1. An energy absorber comprising:
   a support attachment member to attach the energy absorber to a supporting structure in an initial orientation;
   a load attachment member;
   a coiled length of plastically deformable metal wire having a first end and a stop formed on a second end; and
   a deployment member, attached to one of the support attachment member and said load attachment member, the other one of the support attachment member and load attachment member being connected to the first end of the metal wire, the deployment member initially cooperating with a region of the metal wire adjacent to the first end thereof, the deployment member further provided with at least one guide roller about which the metal wire is entrained;
   wherein when a force exceeding a first predetermined limit is applied to the load attachment member, the support attachment member and load attachment member orient in alignment with the direction of the applied force, when the force exceeds a second predetermined level, the deployment member roller periphery translates along the length of the metal wire causing the metal wire to locally straighten as the deployment member translates along the length of the metal wire absorbing energy.

2. An energy absorber as claimed in claim 1 in which the coil is a helical coil.

3. An energy absorber as claimed in claim 1, in which the end stop is able to resist a load of at least twice the second predetermined tensile load.

4. An energy absorber as claimed in claim 1, in which the end stop prevents the yielding material becoming released from the deployment member.

5. A fall arrest system incorporating an energy absorber according to claim 1.

6. An energy absorber comprising:
   a support attachment member to attach the energy absorber to a supporting structure in an initial orientation;
   a load attachment member;
   a coiled length of plastically deformable metal wire having a first end and a stop formed on a second end; and
   a deployment member, attached to one of the support attachment member and said load attachment member, the other one of the support attachment member and load attachment member being connected to the first end of the metal wire, the deployment member initially cooperating with a region of the metal wire adjacent to the first end thereof, the deployment member further provided with at least one guide roller about which the metal wire is entrained;
   wherein when a force exceeding a first predetermined limit is applied to the load attachment member, the support attachment member and load attachment member orient in alignment with the direction of the applied force, when the force exceeds a second predetermined level, the deployment member roller periphery translates along the length of the metal wire causing the metal wire to locally deform and absorb eneray with the force required to translate the deployment member along the length of the metal wire being substantially constant until the stop abuts the deployment member.

7. A fall arrest system incorporating an energy absorber according to claim 6.

8. An energy absorber as claimed in claim 6 in which the coil is a helical coil.

9. An energy absorber as claimed in claim 6, in which the end stop is able to resist a load of at least twice the second predetermined tensile load.

10. An energy absorber as claimed in claim 6, in which the end stop prevents the yielding material becoming released from the deployment member.

\* \* \* \* \*

UNITED STATES PATENT AND TRADEMARK OFFICE
CERTIFICATE OF CORRECTION

| | | |
|---|---|---|
| PATENT NO. | : 7,104,371 B2 | Page 1 of 1 |
| APPLICATION NO. | : 10/276733 | |
| DATED | : September 12, 2006 | |
| INVENTOR(S) | : Julian Renton | |

It is certified that error appears in the above-identified patent and that said Letters Patent is hereby corrected as shown below:

Column 16, Line 34, Claim 6:

Delete "eneray" and insert therefor -- energy --.

Signed and Sealed this

Twenty-sixth Day of December, 2006

JON W. DUDAS
*Director of the United States Patent and Trademark Office*